No. 894,266. PATENTED JULY 28, 1908.
C. T. GILMORE.
SHIRT IRONING MACHINE.
APPLICATION FILED JAN. 21, 1907.

3 SHEETS—SHEET 1.

Witnesses:
Chas. L. Gaylord.
John Enders.

Inventor:
Charles T. Gilmore,
By Dyrenforth, Dyrenforth, Lee & Wiles,
Attys.

No. 894,266. PATENTED JULY 28, 1908.
C. T. GILMORE.
SHIRT IRONING MACHINE.
APPLICATION FILED JAN. 21, 1907.

3 SHEETS—SHEET 2.

Witnesses:
Inventor:
Charles T. Gilmore,
By Dyrenforth, Dyrenforth, Lee & Wiles,
Attys.

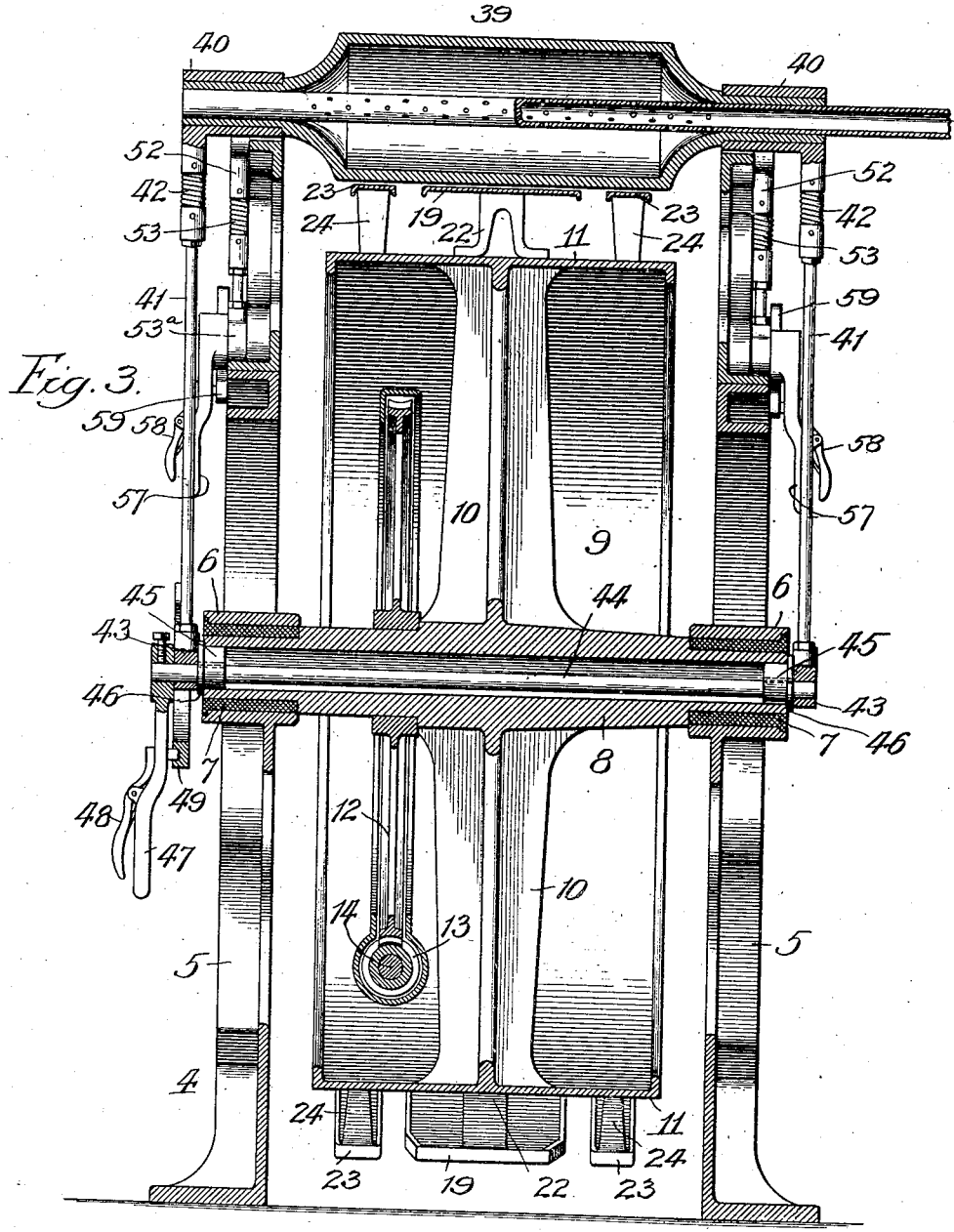

UNITED STATES PATENT OFFICE.

CHARLES T. GILMORE, OF CHICAGO, ILLINOIS.

SHIRT-IRONING MACHINE.

No. 894,266.  Specification of Letters Patent.  Patented July 28, 1908.

Application filed January 21, 1907. Serial No. 353,300.

*To all whom it may concern:*

Be it known that I, CHARLES T. GILMORE, a citizen of the United States, residing at Chicago, in the county of Cook and State of Illinois, have invented a new and useful Improvement in Shirt - Ironing Machines, of which the following is a specification.

The object of my invention is to provide a novel construction of rotary ironing-machine adapted to iron shirt-bosoms and, by preference, also the wristbands, by carrying the shirts on successive supports or "ironing-boards" upon the rotary carrier, under one or more heated ironing-rollers in their path.
My invention is illustrated in the accompanying drawings, in which—

Figure 1:
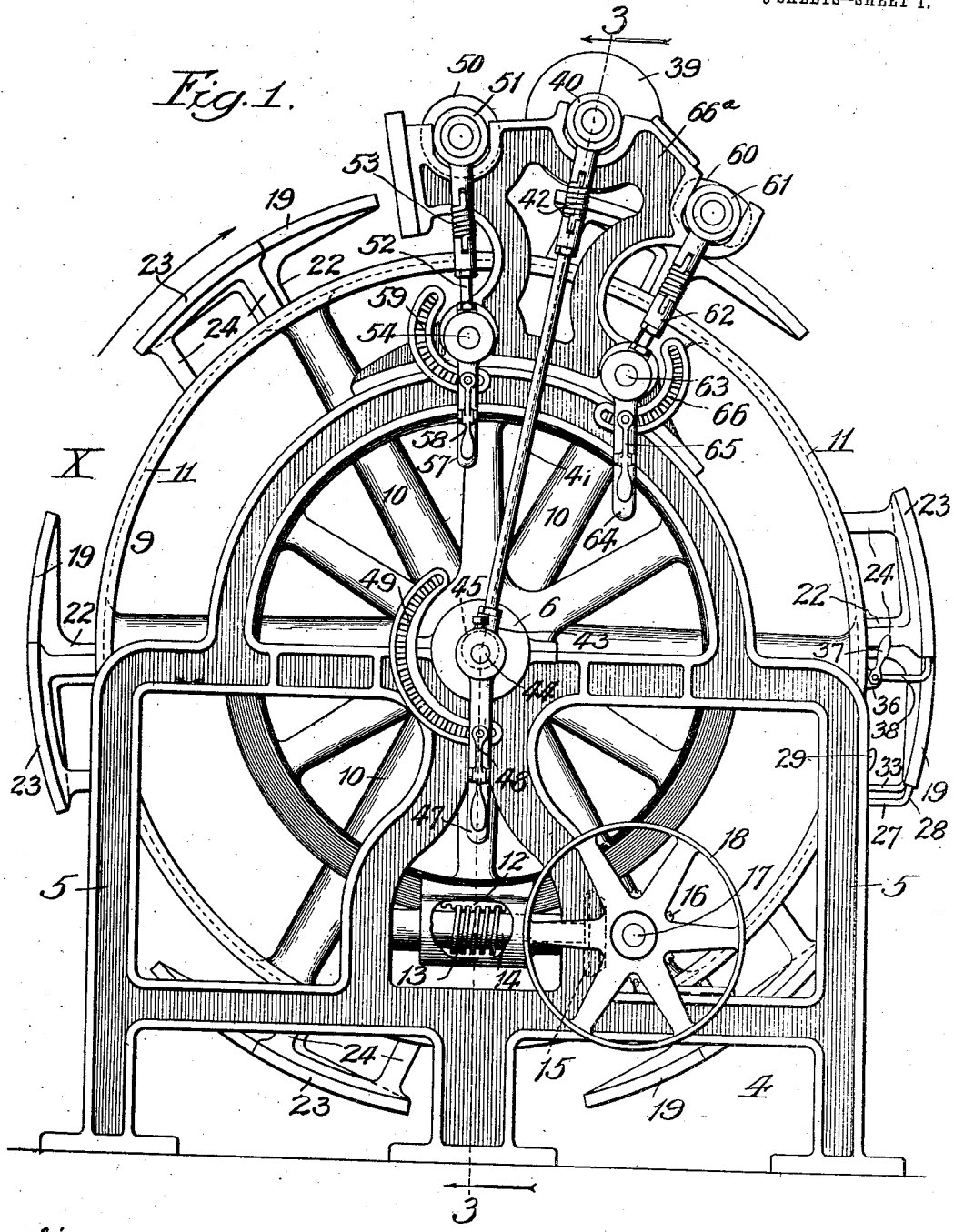
Figure 2:
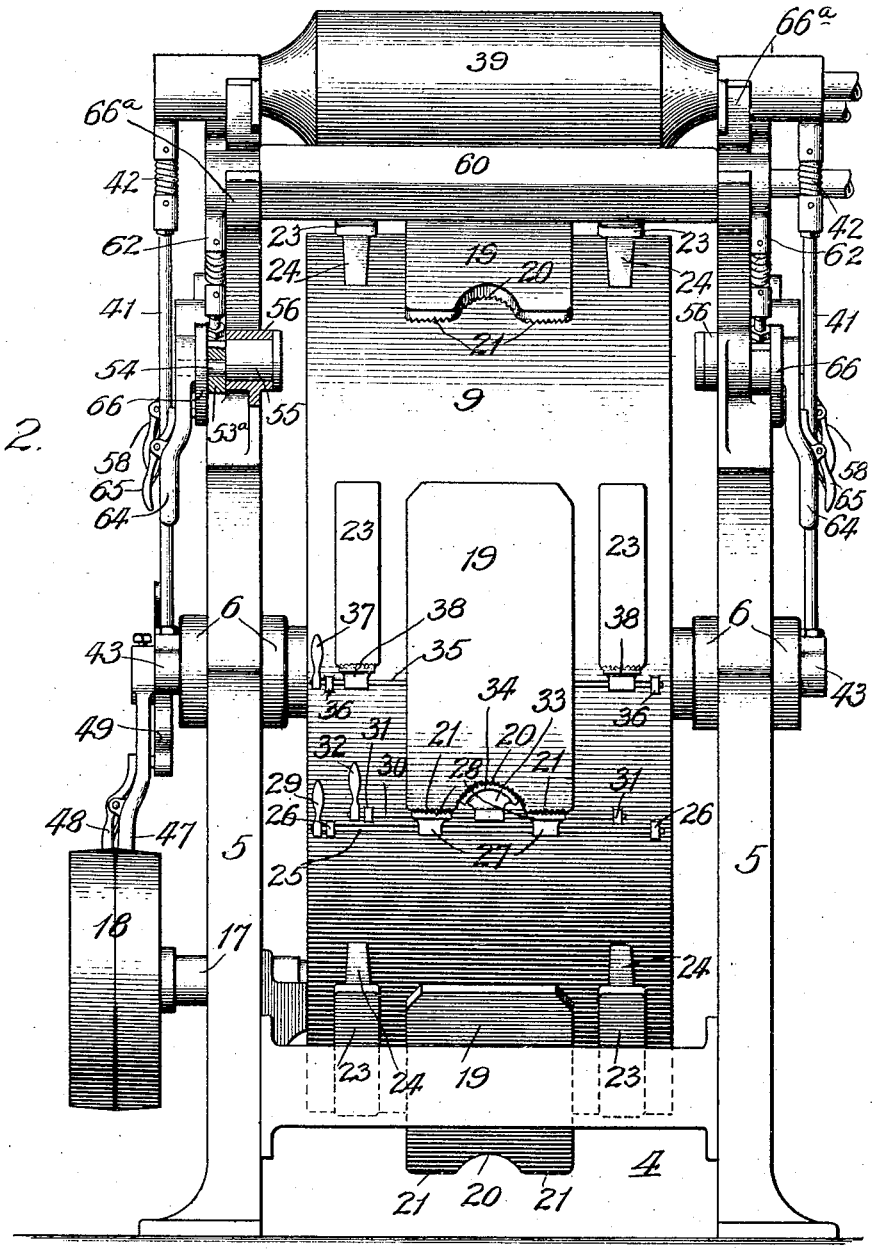

Figure 1 is a view of my improved ironing-machine in side elevation, with parts broken away to show different details; Fig. 2, a view of the same in front elevation with a portion broken away to display a detail of construction, and Fig. 3, a section taken as indicated by the line 3—3 on Fig. 1 and viewed in the direction of the arrows.

On the standards 5, 5, of a suitable frame 4, are provided journal-bearings 6, 6, shown to be lined with thimbles 7, 7, preferably of Babbitt metal, in which are journaled the ends of the tubular hub 8 of a wheel or drum 9, represented as consisting of spokes 10 radiating from the hub and supporting the annular rim 11, thus leaving the sides of the drum open.

The drum is adapted to be rotated continuously in the same direction, and as means for rotating it are shown a worm-wheel 12 secured on the hub 8 inside the drum and meshing with a worm 13, suitably housed, as represented, and carried by a shaft 14 journaled in the frame to be driven by a miter-gear 15 on one end meshing with a similar gear 16 on the adjacent end of the operating shaft 17, which is suitably journaled in the frame and is equipped with a belt-pulley 18 for connection with the driving power (not shown).

At suitable intervals about the rim 11 are provided, in series, ironing-boards 19, each being, by preference, of the general rectangular form represented and curved longitudinally into arc-shape, with a neck-band recess 20 in one end between shoulder-bearings 21, 21, which should have roughened surfaces. Each board 19 has a central leg 22, at which it is rigidly fastened in position upon the rim 11. Similar wristband-ironing boards 23, 23, are shown to be provided on opposite sides of each board 19, being rigidly secured on the rim of the drum at their end-legs 24, 24, the tops of these boards, which, like the boards 19 are of metal, being also curved longitudinally into arc-shape, and the ironing surfaces of each set of the three boards occupying the same plane.

Each set of the boards 19 and 23 is provided with clamps for removably securing upon them a shirt to be ironed at its neck-band and shoulder-portions and adjacent to the wristbands. Any suitable clamping means may be provided for these purposes, the means illustrated having the following-described construction: A rock-shaft 25, journaled in suitable bearings 26, carries similar clamping arms 27, 27, to engage at their head-portions 28 with the shoulders 21 of a board 19, this shaft 25 carrying on one end a handle 29, by means of which to manipulate it. A similar rock-shaft 30, journaled in bearings 31, and carrying on one end an operating handle 32, is provided intermediate its ends with a clamp-arm 33 terminating in a curved clamping-head 34 to conform to and engage with the neck-band recess 20. For clamping the shirt-arms, near the wristbands, to the ends of the boards 23, which should also be slightly roughened, a third rock-shaft 35, journaled in bearings 36 and provided on one end with an operating handle 37, carries headed clamping-arms 38, 38, like the arms 27, to engage with the adjacent roughened ends of the wristband-ironing boards.

To avoid complicating the drawings with unnecessary illustration, only one set of the boards 19, 23, is shown to be equipped with the described clamping means, but each set thereof is provided, in practice, with similar clamping means, as will be understood.

The main ironing-roller is represented at 39. It is heated in any suitable way, as by the ordinary gas-heating means represented, and is journaled at its ends in bearings 40, 40, formed on the upper ends of similar rods 41, 41, each containing a spring-section 42 and connected at its lower end with an annular head 43. The heads 43 loosely surround the opposite projecting ends of a rock-shaft 44 extending eccentrically through the hollow hub 8, in the ends of which it is fastened in similar eccentric collars 45, 45 journaled in the hub-ends and provided with flanges 46, 46 to prevent longitudinal movement to the eccentric rock-shaft. On one end of the shaft 44 is provided an operating handle 47, equipped with a spring-pawl 48 to engage with an adjacent segmental rack 49 provided on a frame-standard. A smaller ironing-roller 50, heated like the roller 39, is journaled at its ends in bearings 51 formed on the upper ends of rods 52, like the rods 41 and containing spring-sections 53, and the lower end of each rod 52 is connected with a collar 53ª, loosely surrounding a stub-shaft 54 which projects eccentrically from the outer end of a cylindrical head 55 journaled in a bearing 56 provided in the respective frame-standard 5. The detailed construction last described is shown only of one of the rods 52 in Fig. 2, but is the same as the companion-rod. On the outer end of each stub-shaft 54 is provided an operating handle 57 equipped with a spring-dog 58 to engage with an adjacent segmental rack 59 on the frame.

At the side of the main roller 39 opposite to that at which the roller 50 extends across the rim of the drum, is provided a hollow polishing shoe 60, heated like the rollers. This shoe is supported at its ends in bearings 61 formed on the upper ends of rods 62, in all respects like the rods 52, and similarly engaging at their lower ends with eccentric stub-shafts 63 journaled in bearings in the frame-standards and carrying operating handles 64 equipped with spring-dogs 65 to engage with segmental racks 66, all as described of the rods 52. Similar supplemental rigid frame-sections 66ª, 66ª rise in slightly slanting position from the frame-standards 5, 5, as shown, and form guides for the ends of the ironing-rollers and polishing shoe in their slight up and down movements.

The machine operates as follows: With the drum 11 slowly rotating continuously in the direction of the arrow on Fig. 1, under the driving action of the described worm-gear, an attendant adjusts a shirt to be ironed on a set of ironing-boards, as the set thereof in the position represented at X on Fig. 1. The adjustment consists in enveloping the respective board 19 in the garment, in a manner to apply the bosom to be ironed on the surface of the board and bring the neck-band into the recess 20 and the shoulders against the parts 21, when the shafts 25 and 30 are turned to engage the clamp-heads 28 and 34 with the respective portions of the shirt and hold it in place; and the wristbands are adjusted lengthwise on the tops of the boards 23, parts of the shirt-sleeves being stretched over the ends of these boards and clamped by the heads of the clamping-arms 38, on turning the shaft 35 for the purpose, to hold the wristbands in place. The shirt thus positioned is carried by the drum first under the ironing-roll 50 in the path of the ironing-boards, and in moving across that roller, the bosom and wristbands are preliminarily ironed. The continued motion of the drum thereupon subjects the parts of the shirt to the action of the larger, finishing, ironing-roller 39, after which they are polished by being carried under the shoe 60 in their path. The ironing-rollers and shoe are lowered, by turning, to the positions represented in Fig. 1, the handles controlling their respective supporting rods, to bring them in the path of the work and exert required yielding pressure thereon under the force of the spring-sections in the rods. By raising these handles, which are retained in any adjusted position by engagement of the spring-pawls with the adjacent racks, the rollers and shoe may be raised out of the path of the work, when required, to interrupt the ironing and polishing operations.

When a set of the ironing-boards clears the polishing shoe, an attendant unclamps the shirt and removes it from the machine. With the continuous movement of the drum carrying the series of ironing-boards, or sets thereof, one attendant may be adjusting a shirt at X while another shirt is being operated on by the machine and while still another attendant is removing a finished shirt. Thus the machine is continuously operative, in the sense of not requiring to be interrupted to permit the adjustment of the work upon it; and by having its movement always in the same direction the bosoms undergoing the ironing operation are ironed only in one direction, namely lengthwise from the neck-band to the opposite end, thus avoiding the objection to ironing it by reciprocating the ironing pressure lengthwise thereof, which tends to crease the bosom adjacent to the neck-band and otherwise impair its laundered appearance.

What I claim as new and desire to secure by Letters Patent is—

1. In a shirt-ironing machine, the combination of a frame, a drum journaled in said frame and having a rim, means for rotating the drum in one direction, ironing-boards rigidly supported at intervals about the rim of the drum, and a spring-pressed polishing-shoe and a spring-pressed ironing-roller adjustably supported to extend, one in advance of the other, across the drum in the path of said boards.

2. In a shirt-ironing machine, the combination of a frame, a drum journaled in said frame, means for rotating the drum in one direction, sets of ironing-boards unyieldingly supported at intervals in series upon the drum, each set consisting of a bosom-board and wristband-boards at opposite sides thereof, and a spring-pressed polishing-shoe and a spring-pressed ironing-roller adjustably supported to extend, one in advance of the other, across the drum in the path of said boards.

3. In a shirt-ironing machine, the combination of a frame, a drum journaled in said frame, means for rotating the drum in one direction, ironing-boards unyieldingly supported at intervals in series upon the drum, a preliminary ironing-roller, a larger ironing-roller adjacent thereto and a polishing-shoe adjacent to said larger roller, said rollers and shoe being spring-pressed and adjustably supported in the path of said boards.

4. In a shirt-ironing machine, the combination of a frame, a drum journaled on said frame, means for rotating the drum in one direction, ironing-boards unyieldingly supported at intervals in series upon the drum, said drum having a tubular hub, a rock-shaft eccentrically journaled in said hub and provided with an operating handle, means for holding said rock-shaft in any position to which it is turned, rods journaled on the ends of said rock-shaft, having spring-sections and terminating at their upper ends in bearings, and an ironing-roller journaled at its ends in said bearings to extend across the drum in the path of said boards.

5. In a shirt-ironing machine, the combination of a frame, a drum journaled in said frame, means for rotating the drum in one direction, ironing-boards unyieldingly supported at intervals in series upon the drum, an ironing-roller and a polishing-shoe, and eccentrically-supported rods containing spring-sections and terminating at their upper ends in bearings in which said roller and shoe are supported to extend across the drum in the path of said boards.

6. In a shirt-ironing machine, the combination of a frame, a drum journaled on said frame, means for rotating the drum in one direction, ironing boards unyieldingly supported at intervals in series upon the drum, said drum having a tubular hub, a shaft journaled in said hub, rods on the ends of said shaft having spring sections and terminating at their upper ends in bearings, and an ironing-roller journaled at its ends in said bearings to extend across the drum in the path of said boards.

CHARLES T. GILMORE.

In the presence of—
J. H. LANDES,
C. W. WASHBURN.